(No Model.) 2 Sheets—Sheet 1.

W. E. TAFT.
DRIVING MECHANISM FOR BICYCLES.

No. 600,752. Patented Mar. 15, 1898.

WITNESSES:

INVENTOR:
Walter E. Taft.

(No Model.) 2 Sheets—Sheet 2.

W. E. TAFT.
DRIVING MECHANISM FOR BICYCLES.

No. 600,752. Patented Mar. 15, 1898.

WITNESSES:

INVENTOR:
Walter E. Taft.

UNITED STATES PATENT OFFICE.

WALTER E. TAFT, OF PROVIDENCE, RHODE ISLAND, ASSIGNOR TO ISAAC W. SAWIN, OF SAME PLACE.

DRIVING MECHANISM FOR BICYCLES.

SPECIFICATION forming part of Letters Patent No. 600,752, dated March 15, 1898.

Application filed August 13, 1897. Serial No. 648,171. (No model.)

*To all whom it may concern:*

Be it known that I, WALTER E. TAFT, a citizen of the United States, residing at Providence, in the State of Rhode Island, have invented a new and useful Improvement in Driving Mechanism for Bicycles, of which the following is a specification.

The object of my invention is to provide means for imparting power to the driving-wheel with the least possible amount of friction; and it consists in an improved combination of gearing with means for adjustment, whereby proper compensation may be made for wear, as hereinafter fully set forth.

Figure 1:
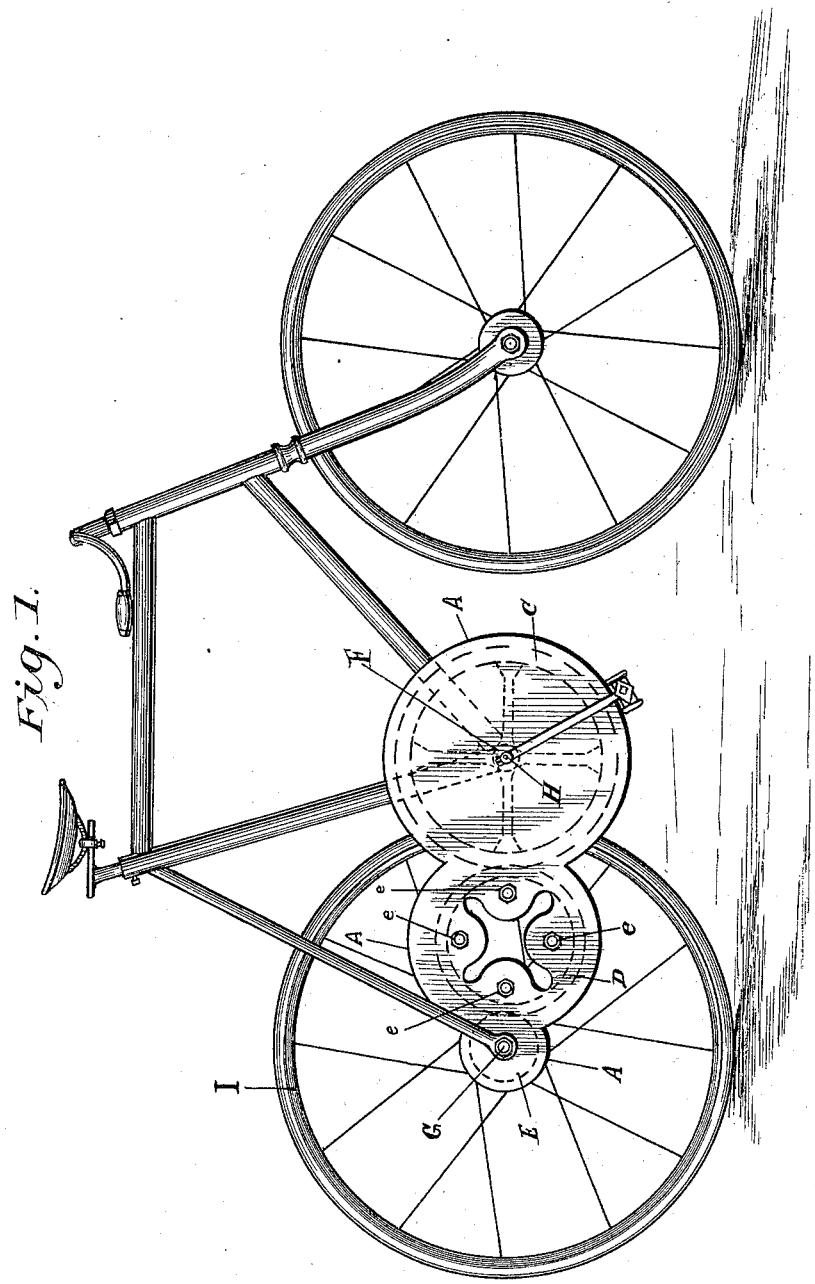
Figures 2, 3:
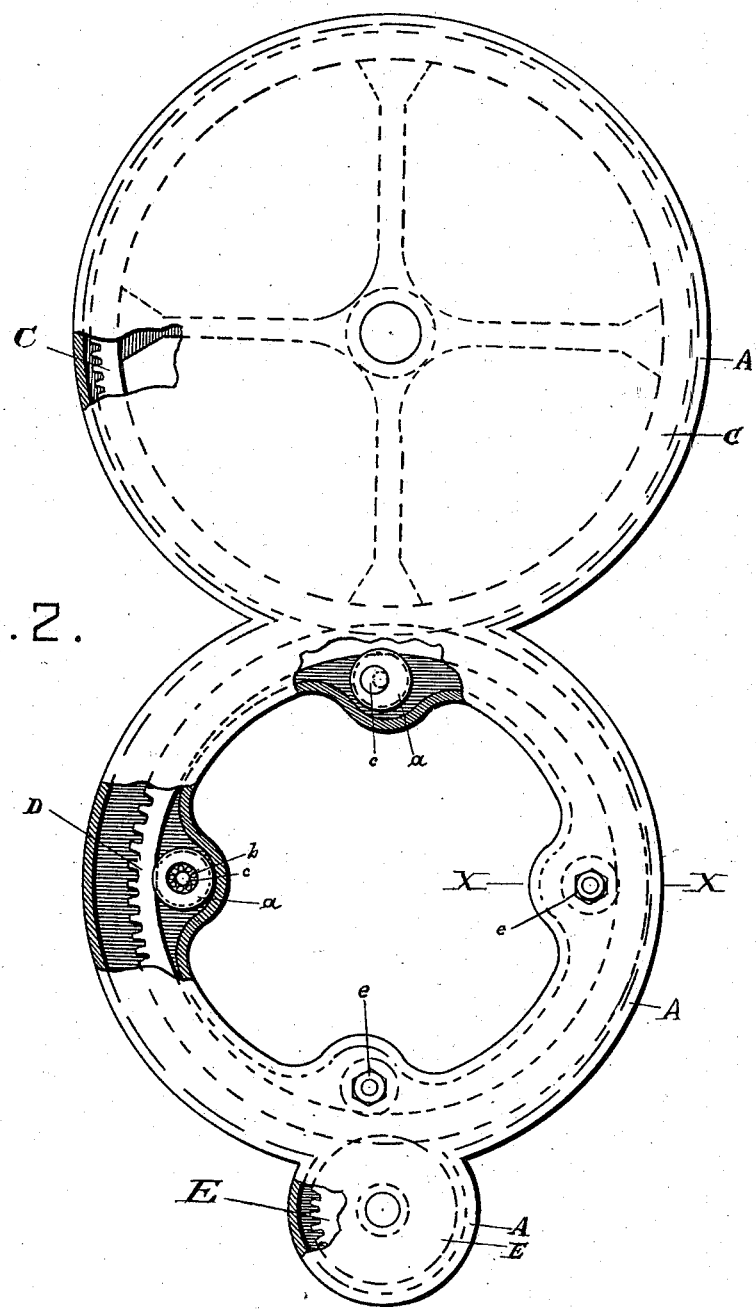

Figure 1 represents a side view of bicycle provided with my improvement. Fig. 2 represents an enlarged side view of the gear-holding case with a portion broken away. Fig. 3 represents an enlarged cross-section view through the line X X of Fig. 1.

Referring to Fig. 1, F represents the crank-shaft bracket; G, the driving-wheel bracket; I, the driving-wheel; H, the crank-shaft.

Referring to Figs. 2 and 3, A represents a metal casing; B, a removable cover; C, the crank-shaft gear; D, the intermediate annular gear; E, the driving-wheel pinion; $a$, the grooved rolls; $a'$, web on the grooved rolls; $b$, steel balls; $c$, eccentric bearings; $d$, steel washers; $e$, nuts on eccentric bearings; $f$, dowel-pins; $g$, slot in eccentric bearing.

In operating the invention I place the gear-casing A in position extending between the crank-shaft bracket F and driving-wheel bracket G, fixedly securing it to the crank-shaft bracket F. I then secure the crank-shaft gear C to the crank-shaft H and the driving-wheel pinion E to the driving-wheel I, placing the intermediate annular gear D in position within the peripheral grooves $h$ of the rolls $a$ with the eccentric bearings $c$ in position, then placing the gear-case cover B upon the gear-case A and securing it by tightening the nuts $e$. I then secure the gear-case A to the driving-wheel bracket G. I now loosen the nuts $e$ and with a screw-driver inserted in the slots $g$ of eccentric bearings $c$ turn the said bearings in the direction desired and adjust the annular gear D in mesh with the gear C and pinion E, securing the said bearings with the nuts $e$.

It will be obvious to skilled mechanics that these details may be varied without departing from the spirit of the invention.

Having thus described my invention, what I claim as new, and desire to secure by Letters Patent, is—

1. The combination of the crank-shaft bracket, the driving-wheel bracket, and the gear-inclosing case connected with the brackets, with the crank-shaft, the crank-shaft gear, the driving-wheel pinion, the intermediate annular gear, the antifriction-rolls for supporting the intermediate gear, and the eccentric bearings held in the opposite sides of the gear-inclosing case, substantially as described.

2. The combination of the crank-shaft bracket, the driving-wheel bracket and the gear-inclosing case connected with the brackets, with the crank-shaft, the crank-shaft gear, the driving-wheel pinion, the intermediate annular gear, the antifriction-rolls for supporting the intermediate annular gear and adjustable eccentric bearings for the antifriction-rolls substantially as described.

WALTER E. TAFT.

Witnesses:
FRED A. MARCY,
W. A. AINSWORTH.